United States Patent Office 3,679,627
Patented July 25, 1972

3,679,627
HYDROXYLATED ALPHA-OLEFIN/NON-CONJUGATED DIENE POLYMER
Jerald R. Harrell, Anestis L. Logothetis, and John J. Verbanc, Wilmington, Del., assignors to E. I. du Pont de Nemours and Company, Wilmington, Del.
No Drawing. Continuation-in-part of application Ser. No. 764,328, Oct. 1, 1968. This application July 9, 1969, Ser. No. 840,511
Int. Cl. C08d *11/00*
U.S. Cl. 260—41.5
6 Claims

ABSTRACT OF THE DISCLOSURE

An hydroxylated alpha-olefin/non-conjugated diene polymer having hydroxylated side chains in admixture with clay, ZnO, $ZnBr_2$, a phenol-formaldehyde resin or polyisocyanate. An hydroxylated alpha-olefin/non-conjugated diene polymer having hydroxyl substituted side chains containing one hydroxyl group each and other side chains containing ethylenic unsaturation and a process for making.

PRIORITY

This application is a continuation-in-part of application Ser. No. 764,328, filed Oct. 1, 1968 and now abandoned.

BACKGROUND OF THE INVENTION

It is well known to prepare alpha-olefin/non-conjugated diene (ODM) polymers such as ethylene/diene dipolymers and ethylene/propylene/diene terpolymers and the like in which the diene is a non-conjugated diene with only one terminal double bond (i.e., polymerizable double bond). Such polymers have saturated-hydrocarbon-backbones which provide excellent resistance to aging, particularly in the presence of oxygen or ozone. However, because these polymers are relatively unreactive and generally have poor adhesive properties, they are useful only in a limited number of applications. There has been a need for polymers having the beneficial characteristics of these saturated-hydrocarbon-backbone polymers but which would also be capable of use in a wide variety of applications, particularly in cements, adhesives and latexes and in the preparation of vulcanizates and derivatives.

SUMMARY OF THE INVENTION

In accordance with this invention there is provided an hydroxylated alpha-olefin/non-conjugated diene polymer containing hydroxyl substituents in the amount of about 0.05–5 gram moles of hydroxyl groups per kilogram of polymer. The diene is a non-conjugated diene with only one polymerizable double bond (only one of the double bonds polymerizes to any significant extent to form the backbone of the polymers of this invention) and is preferably an acyclic non-conjugated diene with only one terminal double bond. One species of hydroxylated polymers can be prepared by heating the unmodified polymer with diborane at about 25–250° C., treating the reaction product with oxygen and then an aqueous medium. Another can be made by reacting the precursor polymer with performic acid. The modified polymer has some side chains with hydroxyl substituent groups and others with ethylenic unsaturation.

The hydroxylated polymers of this invention possess unique properties. Thus an admixture of the hydroxylated polymer with clay can be extruded or molded and upon heating produces a vulcanizate which is rubbery and tough with good strength without conventional curing or the use of curing formulations normally required to produce vulcanized elastomers.

Similarly admixtures of the hydroxylated polymer with a heavy metal oxide or halide such as zinc oxide or zinc bromide upon heating produce a cured stock free from bloom and sulfur odor and having excellent color retention compared with sulfur cured systems. Mixtures of an hydroxylated polymer latex with conventional resorcinol-formaldehyde resins used in automobile tire cord dips are useful as tire cord dips while compositions of the hydroxylated polymers containing polyisocyanates are suitable for bonding alpha-olefin/diene rubbers to practically any substrate. The latter compositions can also be used as a bonding agent in conventional paper-making machinery to prepare paper-like non-woven sheets from synthetic fibers.

DETAILS OF THE INVENTION

The precursor polymers utilized to prepare the hydroxylated polymers of this invention are alpha-olefin/non-conjugated diene (ODM) polymers, preferably ethylene/alpha-olefin/diene (EODM) terpolymers having pendant groups which can be hydroxylated to provide polymers with some pendant (side chain) groups having an hydroxyl substituent. Usually other pendant groups contain ethylenic unsaturation. Typical of the precursor polymers is an ethylene/propylene/diene polymer such as ethylene/propylene/1,4-hexadiene. When hydroxylated by reaction with diborane, this terpolymer has one of the following characteristic structures:

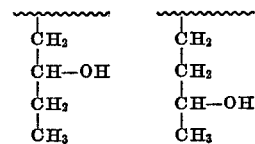

where the wavy line represents the polymer backbone. When hydroxylated by other procedures, as by treatment with performic acid, each hydroxylated side chain can contain two hydroxyl groups on adjacent carbon atoms, and other side chains can contain other substituents such as epoxide or formate ester groups.

The alpha-olefin used in preparing the ODM precursor polymer can be ethylene or a higher alpha-olefin. Preferred precursor polymers are terpolymers having the composition ethylene/$C_3$–$C_8$ alpha-olefin/aliphatic diene, the alpha-olefin being propylene, 1-butene, 2-butene, 1-pentene, etc.

The dienes useful in preparing the ODM polymers useful in this invention are non-conjugated dienes containing only one polymerizable double bond. Preferred are $C_6$–$C_{22}$ aliphatic dienes with only one terminal double bond such as 1,4-hexadiene, 1,4-heptadiene, 1,5-heptadiene, 1,5-octadiene and the like. Useful cyclic dienes include dicyclopentadiene; 1,5-cyclooctadiene, 5-alkenyl-2-norbornenes such as 5(1-butenyl)-2-norbornene; 5-alkylidene-2-norbornenes such as 5-ethylidene-2-norbornene and 5-methylene-2-norbornene. Other dienes of this type are well known in the art and can be utilized in this invention so long as they provide or can be modified to provide the ODM precursor polymer with pendant groups containing hydroxyl substituents and side chain ethylenic unsaturation such as disclosed herein.

The diene monomeric unit in the polymer can be present in the amount of about 3% to as much as 25–30% by weight of polymer in the case of cyclic dienes. Aliphatic diene monomeric units are present in the amount of about 3 to 12% by weight of polymer and preferably in the amount of 3–7% on this basis.

The precursors polymers are known to the art, and the art is also well aware of how these polymers can be made. Representative polymers are disclosed in U.S.

2,933,480, U.S. 3,093,620 and U.S. 3,093,621. The hydroxylated polymers of this invention may be prepared by reacting a conventional ODM polymer in solution in an inert solvent with diborane (B₂H₆) at about room temperature to 250° C., preferably at an elevated temperature of about 50° C. to 225° C. In place of diborane there can be utilized amine boranes such as trialkyl amine boranes (R₃N·BH₃), THF·BH₃, etc. where R is C₁–C₁₈ alkyl, such as methyl, ethyl, propyl or butyl. Amine boranes which are stable oils or solids at room temperature should be used at higher temperatures such as 80° C. or above at which temperatures the position of the equilibrium $$R_3N \cdot BH_3 \rightleftharpoons R_3N + BH_3$$

is shifted substantially to the right. A preferred trialkylamine borane is trioctylamine borane. Following completion of the reaction the product is oxidized and then hydrolyzed to produce an hydroxylated polymer of this invention with each hydroxylated side chain containing one hydroxyl group. The polymer also contains ethylenic unsaturation in side chains formed by the diene monomer unit which are not hydroxylated. The polymers can contain about 0.05–5 gram moles hydroxyl per kilogram of polymer but preferably about 0.1–1 gram mole on this basis. The hydroxyls are not attached to the backbone of the polymer but rather to pendant carbon chains and similarly the ethylenic unsaturation is in pendant carbon chains.

The oxidation of the polymer-diborane reaction product can be effected by air, molecular oxygen, hydrogen peroxide or other suitable oxidizing compounds. Three atoms of oxygen are provided for each atom of boron. Oxidation is effected simply by exposure to air at room temperature for at least a few minutes. Hydrolysis occurs almost automatically due to moisture present in the polymer solution but additional water can be added if needed. Following oxidation and hydrolysis, the polymer can be isolated from the solvent using conventional procedures such as steam distillation or precipitation. Alternatively the crude reaction product comprising the hydroxylated polymer in the organic solvent can be used directly as a cement or adhesive. Also, the solvent solution of polymer can be admixed with an aqueous medium containing a dispersing agent to form a latex useful for impregnation of fabrics or as a coating composition or adhesive.

Alternatively the precursor polymer can be hydroxylated by reaction with performic acid in an organic solvent at a temperature above room temperature (preferably at about 30–50° C.) for a period of 1 to 3 hours. It is thought that performic acid reacts with the carbon atoms joined by the ethylenic double bonds in the side chains to produce hydroxylated pendant groups. The polymer product can be recovered in any conventional manner as described above or the reaction product solution can be utilized directly as a cement or converted to a latex. Polymers of this invention which contain two hydroxyl groups per hydroxylated side chain are used in the same manner as the polymers with monohydroxyl pendant groups, and for the same purposes. The extra hydroxyl group does not appear to adversely affect the polymer performance.

The hydroxylated polymers of this invention which are prepared by reacting an alpha-olefin/non-conjugated diene polymer with performic acid normally contain epoxy groups and formoxy (formate ester) groups as well as hydroxy groups attached to hydrocarbon side chains, and in some instances the latter can be present in less than a major proportion, although the usefulness of the polymers in the various embodiments of this invention is not adversely affected thereby. Such polymers having varied side chain substituent groups can be treated to increase the proportion of one or more of the groups at the expense of the others. Thus 100 g. ethylene/propylene/1,4-hexadiene polymer having a Mooney viscosity of 60 (ML. 1+4/121° C.) and containing 36% propylene units, 58.3% ethylene units and 5.7% 1,4-hexadiene units and with side chains containing ethylenic unsaturation (0.46 mol/kg.) upon heating for three hours at 35° C. as a 4.5% solution in tetrachloroethylene in the presence of 555 g. of formic acid and 104 ml. of 30% hydrogen peroxide, produces a product which analyzes for the following functionality (moles per kilogram of polymer); (C=C), 0.19; epoxy, 0.17; formate ester, 0.1; hydroxyl, 0.10 or more (e.g., OH adjacent to formate ester or as glycol). When this product is heated for nine hours at 85° C. with paratoluene sulfonic acid it is converted to a polymer which analyzes for the following functionality (moles/kg. of polymer); C=C, 0.20; epoxy, zero; formate ester, 0.26; hydroxyl, 0.26 or more (as OH adjacent to formate ester or glycol). When this product is in turn heated for 16 hours at 85–90° C. in tetrachloroethylene (2% weight/volume solution) in the presence of 280 parts of 10 molar of sodium hydroxide and 6 parts (based on the polymer) of an 85% solution of a quaternary ammonium chloride in a 50/50 mixture of water and isopropanol, the chloride having the formula

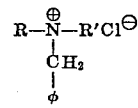

where R is a mixture of C₈–C₁₈ alkyl (predominantly C₁₂–C₁₄) and R' is

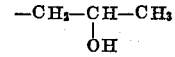

the product analyzes as free from epoxy and formate ester groups and shows only C=C groups (0.20 mole/kg.) and hydroxyl groups (0.52) (present in glycol) attached to side chains.

On the other hand when 100 g. of this ethylene/propylene/1,4-hexadiene polymer is allowed to stand at room temperature for 16 hours as a 4.5% (weight/weight) solution in tetrachloroethylene with 88 g. of 40% peracetic acid in acetic acid there is produced a polymer having a small amount of hydroxyl groups attached to the side chains and containing no ester groups but a preponderance of epoxy groups (0.44 mole per kg.). All of these products analyze for significant ethylenic unsaturation in side chains of the polymer which permits vulcanization with sulfur. All of the aforesaid polymers contain hydroxy groups attached to some of the polymer side chains and ethylenic unsaturation in others and are useful in the several embodiments of this invention.

Solvents useful for preparing the precursor alpha-olefin/diene polymers are generally suitable for carrying out the hydroxylation process of this invention. Representative solvents include tetrachloroethylene, n-hexane, n-pentane, n-heptane and the like. The art is well aware of suitable solvents for this purpose.

Hydroxylated polymers of this invention have a wide variety of utilities. They provide excellent direct adhesion to many materials including cotton, rayon and wool. Mixtures of these hydroxylated polymers with polyisocyanates provide superior adhesion to glass, metals (e.g., aluminum), wood, natural or synthetic polymers such as polyamides, acrylics and polyesters, whether in the form of films or fibers, and provide excellent laminates of these materials having exceptionally strong peel strength as shown in the examples below. For such use as adhesives in preparing laminates or as coating compositions, the hydroxylated polymers are usually in the form of solutions or latexes.

Hydroxylated polymers of this invention can also be mixed with pigments, fillers or other additives (e.g., clays, carbon black, antioxidants, stabilizers, light filters and the like) conventionally used in the rubber art to extend or color elastomeric polymers. In one specific embodiment of this invention an hydroxylated polymer is admixed with about 120 phr. (parts per hundred parts polymer by weight) of a "hard" kaolin clay and molded at 100° C.

under pressure to produce an elastomeric composition which is rubbery, tough and has good strength without conventional curing. This clay-extended product can also be extruded and provides an elastomeric composition having the properties of a cured polymer but without the separate curing step or the curing formulations normally required. The amount of clay can vary from about thirty to several hundred parts per hundred parts polymer by weight (phr.). Other clays are useful but "hard" kaolin is preferred as producing the best product properties.

According to another embodiment of this invention hydroxylated polymer is reacted with an excess polyfunctional isocyanate which is preferably a diisocyanate but can be a tri- or higher functional isocyanate. The isocyanate can be aliphatic or aromatic as desired depending upon the ultimate properties which are needed. Reaction of the hydroxylated polymer with the isocyanate provides an adhesive with an exceptional bonding strength. Fillers such as clay, carbon black and the like can also be incorporated without adversely affecting the strength. Similarly the hydroxylated polymer can be reacted with 6–18 phr., preferably 12 phr. of phenolic resin such as phenol-formaldehyde resin to produce compositions with great cohesiveness and resistance to heat and abrasion making them useful as automobile brake linings. The hydroxylated polymers in all of these compositions can also be cured by conventional means as, for example, with sulfur or peroxides to add additional strength to the ultimate composition.

According to still another embodiment of this invention, an hydroxylated polymer is reacted with 3–10 phr. of a heavy metal oxide (e.g., ZnO) or 0.5–4 phr. of a heavy metal hydroxide or halide (e.g., zinc hydroxide, zinc bromide) in the presence of a long-chain fatty acid (e.g., stearic acid) to produce a cured stock free from bloom and sulfur odor and having excellent color retention compared to sulfur cured system. Other oxides and halides which can be utilized include those of aluminum, lead, magnesium, cadmium, iron, etc., alone or in combination. These cured compositions appear to exhibit the best properties of corresponding sulfur-cured polymers of the same type but without the deficiencies of such products.

The following examples illustrate the invention. All parts, percentages and proportions are by weight unless otherwise indicated. The following copolymers are used in the examples. Tensile test data refers to sample strips 0.635 x 0.19 x 12.7 cm. in size.

POLYMER A

Polymer A is made by copolymerizing ethylene with propylene and 1,4-hexadiene in solution in tetrachloroethylene in the presence of a coordination catalyst formed in situ by mixing vanadium oxytrichloride with diisobutyl aluminum monochloride in accordance with the general procedure of U.S. Pat. 2,933,480. Polymer A has a Mooney viscosity (ML–4/121° C.) of about 70 and contains about 40 weight percent propylene units, 6.6 weight percent total 1,4-hexadiene units and 53.4 weight percent ethylene units. The sulfur-curable unsaturation amounts to about 0.61 g.-mol C=C/kg. by infra-red analysis.

POLYMER B

Polymer B is made substantially the same way as Polymer A except that the proportion of 1,4-hexadiene is lower. Polymer B has a Mooney viscosity of about 70 and contains about 44 weight percent propylene units, 3.5 weight percent total 1,4-hexadiene units and 52.5 weight percent ethylene units. The sulfur-curable unsaturation amounts to about 0.22 g.-mol. C=C/kg. by infra-red analysis.

POLYMER C

Polymer C is made by the same general procedure as Polymer A except that hydrogen modification is employed during the polymerization to lower the Mooney viscostiy of the copolymer to about 40. Polymers A and C are alike in their monomer composition and their degree of unsaturation.

POLYMER D

Polymer D is made by the same general procedure as Polymer B except that hydrogen modification is employed during the polymerization to lower the Mooney viscosity to about 40. Polymers B and D are alike in their monomer composition and their degree of unsaturation.

EXAMPLE 1

Hydroxylation of Polymer A 30.3 liters (50.9 kg.) of a 4.6 weight percent tetrachloroethylene solution of Polymer A (2330 grams), 15.15 liters of tetrachloroethylene and 16.9 liters of 98% formic acid are charged to a 75.7 liter Pfaudler kettle at 25° C. Then 7860 ml. of 30% aqueous hydrogen peroxide is added dropwise over a 75-minute period, cooling being applied when necessary to keep the temperature below 35° C. Stirring with intermittent cooling is continued for 90 minutes. Then 5 grams of 4,4'-thio-bis(3-methyl)-6-tert-butylphenol antioxidant is added. After five minutes, stirring is stopped and the reaction mixture allowed to separate for 30–45 minutes. The tetrachloroethylene lower phase, containing hydroxylated Polymer A, is drawn off and the formic acid present is partially neutralized with ammonium hydroxide. The polymer solution is then pumped to a modified centrifugal pump, thoroughly mixed with water and introduced into a glass settling tower where the separating organic layer is automatically fed to the next washing pump. After leaving the third washing and settling stage, the organic layer, free now from reactants and salts, is dropepd into a collection vessel. The hydroxylated Polymer A, isolated by drum drying weighs 2040 grams. Its inherent viscosity, measured on a 0.1% solution in tetrachloroethylene at 30° C., is 2.95, its Mooney viscosity is 67, and its unsaturation amounts to 0.22 g.-mol of C=C/kg. measured by infra-red analysis. The polymer exhibits an hydroxyl content of about 0.12 mol/kg. of polymer.

Hydroxylation of Polymer C

Analysis:
C=0.35 mole/kg.
Epoxy—0.19 mole/kg.
Formate ester—0.10 mole/kg.
Hydroxyl≥Formate Ester≥0.10

Polymer C is hydroxylated by the same procedure used Polymer A. The product has about 0.3 g.-mole/kg. of sulfur-curable ethylenic unsaturation by I.R. analysis and about 0.1 g.-mole/kg. of hydroxyl groups.

EXAMPLE 2

Curing of hydroxylated Polymer A with a diisocyanate

Hydroxylated Polymer A is banded on a rubber roll mill which is initially at room temperature (about 25° C.). Then high abrasion furnace black is introduced. The mill temperature is raised to about 50° C. and methylene bis(4-phenylisocyanate) is added at 45° C. After uniform mixing the resulting composition

```
                                              Parts by weight
Hydroxylated Polymer A  _____  100
HAF black  _____   50
Methylene bis(4-phenylisocyanate)  _____    5
``` is cured in a pre-heated press at 160° C. for one hour. The resulting vulcanizate has the following properties at 25° C.:

Stress-strain properties

Stress at 100% extension (kg./cm.$^2$)—28.1
Stress at 200% extension (kg./cm.$^2$)—73.1
Stress at 300% extension (kg./cm.$^2$)—133.6
Tensile strength at break (kg./cm.$^2$)—142.0
Extension at break (percent)—310
Tensile set (percent)—11

EXAMPLE 3

Curing of hydroxylated black stocks with ZnO and ZnBr$_2$

Each of Polymer B and hydroxylated Polymer A are compounded on a room temperature rubber roll mill as follows:

| | Parts by weight |
|---|---|
| Polymer | 100. |
| SAF carbon black | 50. |
| Stearic acid | 0.5 or 1. |

Some samples of each formulation are mixed with two phr. ZnBr$_2$ and other samples of each are mixed with five phr. ZnO. The compounded stocks are then formed into 0.191 cm. thick slabs and cured by heating at 160° C. for one hour. The tensile properties of the vulcanized stocks, determined by pulling 0.63 cm. strips on a Instron Tensile Tester at 50.8 cm./min. at 25° C. are given in Table I which shows that hydroxylated Polymer A containing only carbon black and stearic acid can be cured using ZnO and/or ZnBr$_2$ as sole curing agents. Polymer B black stock does not cure with ZnO or ZnBr$_2$. Very good tensile properties are shown by the hydroxylated Polymer A black stock (G) when ZnO and ZnBr$_2$ are used in combination.

EXAMPLE 5

Curing black loaded hydroxylated Polymer A with oil soluble phenolic resin

Hydroxylated Polymer A is compounded on a rubber roll mill at room temperature with SAF carbon black, zinc oxide, stearic acid and phenolic resin.

For purposes of comparison a similar stock containing no phenolic resin is prepared and analogous compositions are made wherein Polymer B is substituted for hydroxylated Polymer A. All stocks are then pressed into slabs and heated at 160° C. for one hour. Table III gives the formulations and the vulcanizate properties of the stocks at 25° C. The addition of the phenolic resin enhances the tensile properties of the black loaded hydroxylated polymer stock. Controls based on non-hydroxylated polymer do not cure. The phenolic resin, commercially available from Schenectady Chemical Company as Resin SP 1055 has a specific gravity of 1.00–1.10, a melting point in the range 125–145° F., a bromine content of 3.6–3.9% by weight and a methylol content in the range of 10.00–12.5% by weight. This oil soluble material is prepared by reacting an excess of formaldehyde with 1,1,3,3-tetramethylbutylphenol.

TABLE I

| | A | B | C[1] | D | E[2] | F[1] | G | H |
|---|---|---|---|---|---|---|---|---|
| Hydroxylated Polymer A | 100 | 100 | | 100 | 100 | | 100 | 100 |
| Polymer B | | | 100 | | | 100 | | |
| SAF Carbon Black | 50 | 50 | 50 | 50 | 50 | 50 | 50 | 50 |
| Stearic acid | 0.5 | 1 | 1 | 0.5 | 0.5 | 1 | 1 | 1 |
| ZnBr$_2$ | | 2 | 2 | | | | 1 | |
| ZnO | | | | 5 | 5 | 5 | 5 | 5 |
| Stress at: | | | | | | | | |
| 100% extension (kg./cm.$^2$) | 9.1 | 17.6 | 7.4 | 14.1 | 17.6 | 7.7 | 30.2 | 17.6 |
| 200% extension (kg./cm.$^2$) | 11.2 | 45.7 | 6.7 | 24.6 | 38.6 | 6.3 | 86.5 | 32.3 |
| 300% extension (kg./cm.$^2$) | 14.8 | 121.6 | 6.3 | 47.1 | 85.8 | 5.6 | 182.8 | 61.9 |
| Tensile strength (kg./cm.$^2$) | 16.2 | 154.7 | 6.0 | 116.0 | 179.3 | 5.3 | 229.2 | 129.4 |
| Elongation at break (percent) | 350 | 340 | 660 | 480 | 430 | 430 | 350 | 500 |
| Tensile Set (percent) | 35 | 9 | 127 | 26 | 13 | 86 | 6 | 23 |

[1] Polymer B outside this invention.
[2] Stock placed on 120° C. mill for 3 minutes after compounding.

EXAMPLE 4

Curing of hydroxylated Polymer A black stocks with sulfur

Hydroxylated Polymer A is compounded according to the automobile tire carcass stock formulation given below:

| | Parts |
|---|---|
| Hydroxylated Polymer A | 100 |
| High abrasion furnace black | 80 |
| Naphthenic petroleum oil | 47.5 |
| ZnO | 5 |
| Sulfur | 1.5 |
| Zinc benzothiazylsulfide | 1.2 |
| Zisc dibenzyldithiocarbamate | 2.5 |

Test slabs are cured at 160° C. for 30 minutes. For comparison a similar carcass stock containing Polymer B in place of hydroxylated Polymer A is also cured. The vulcanizate properties at 25° C. are shown in Table II.

TABLE II

| | Hydroxylated Polymer A | Polymer B[1] |
|---|---|---|
| Stress at: | | |
| 100% extension (kg./cm.$^2$) | 23.9 | 14.8 |
| 200% extension (kg./cm.$^2$) | 71.7 | 45.7 |
| 300% extension (kg./cm.$^2$) | 121.6 | 97.0 |
| Tensile Strength (kg./cm.$^2$) | 166.6 | 158.2 |
| Extension at Break (percent) | 390 | 420 |
| Tensile Set (percent) | 8 | 7 |

[1] Outside this invention.

TABLE III

| | A | B | C[1] | D[1] |
|---|---|---|---|---|
| Hydroxylated Polymer A | 100 | 100 | | |
| Polymer B | | | 100 | 100 |
| SAF Carbon Black | 50 | 50 | 50 | 50 |
| ZnO | 5 | 5 | 5 | 5 |
| Stearic acid | 1 | 1 | 1 | 1 |
| Phenolic resin | | 12 | | 12 |
| Stress at: | | | | |
| 100% extension (kg./cm.$^2$) | 17.6 | 21.1 | 7.7 | 10.5 |
| 200% extension (kg./cm.$^2$) | 32.3 | 61.9 | 6.3 | 11.2 |
| 300% extension (kg./cm.$^2$) | 61.9 | 145.5 | 5.6 | 13.4 |
| Tensile at break (kg./cm.$^2$) | 129.4 | 220.1 | 5.3 | 56.2 |
| Elongation at break (percent) | 500 | 400 | 430 | 980 |
| Tensile set (percent) | 23 | 10 | 86 | 115 |

[1] Polymer B (not hydroxylated) having same C=C content as hydroxylated Polymer A is outside invention.

EXAMPLE 6

Mineral filled hydroxylated Polymer A stocks

Hydroxylated Polymer A is compounded with a mineral filler to yield an elastomeric composition which is tough and has good strength without curatives being added.

"Hard" kaolin clay is an air-floated clay containing 44–46% silica, 37.5–39.5% alumina, 1.5–2% iron oxide and 1–2% titanium dioxide by weight, the ignition loss being 13.9–14.2% by weight. The moisture content (maximum) is 1% by weight. The pH (in water) is about 4.5–5.5. This clay has a specific gravity of 2.60; a 325-mesh screen residue of 0.17% by weight and the following particle size distribution (by weight): above 10$\mu$, 0.1%; 5–10$\mu$, 2.8%; 4–5$\mu$, 1.5%; 3–4$\mu$, 2.3%; 2–3$\mu$, 3.4%; 1–2$\mu$, 9.0%; 0.5–1$\mu$, 19.0%; 0–0.5$\mu$, 61.9%.

Hydroxylated Polymer A is mixed with 120 phr. "hard" kaolin clay on a rubber roll mill (initially at room temperature). The resulting uniformly mixed composition is molded into 2.54 x 12.7 x 0.191-cm. slabs (pressed 3 min. at 100° C.). Strips are then cut and pulled on an Instron Tensile Tester. The data thus obtained compared with that for a control Polymer B—"hard" kaolin clay stock, prepared by the same procedure, are given in Table IV.

TABLE IV

| | Hydroxylated Polymer A | Polymer B [1] |
|---|---|---|
| Stress at 100% elongation (kg./cm.²) | 45.0 | 7.73 |
| Tensile strength (kg./cm.²) | 59.1 | 4.9 |
| Elongation at Break (percent) | 170 | 300 |
| Tensile set (percent) | 11 | 107 |

[1] Outside this invention. Polymer B has substantially the same Mooney viscosity and unsaturation as hydroxylated Polymer A.

Other samples of the clay stocks above were compounded on a rubber mill using the following sulfur formulation:

| | Parts by weight |
|---|---|
| Elastomer+"hard" kaolin (120 phr.) | 220 |
| Naphthenic petroleum oil | 20 |
| ZnO | 5 |
| Stearic acid | 1 |
| Sulfur | 2.5 |
| Tetramethyl thiuram disulfide | 3 |
| 2-mercaptobenzothiazole | 1 |

After these formulations are cured for 30 minutes at 160° C., the tensile properties shown in Table V are obtained on 0.63 cm. strips using an Instron Tensile Tester.

TABLE V

| | Hydroxylated Polymer A | | Polymer B [1] |
|---|---|---|---|
| Stress at: | | | |
| 100% extension (kg./cm.²) | 42.2 | [2] 57.7 | 23.2 |
| 200% extension (kg./cm.²) | 63.3 | [2] 101.9 | 28.8 |
| 300% extension (kg./cm.²) | 92.8 | [2] 126.6 | 35.2 |
| Tensile at break (kg./cm.²) | 116.7 | [2] 126.5 | 99.1 |
| Elongation at break (percent) | 360 | [2] 300 | 560 |
| Tensile set (percent) | 41 | [2] 26 | 50 |

[1] Outside this invention.
[2] Heated on 150° C. mill for 3 minutes.

The hydroxylated Polymer A stock has much improved tensile and modulus properties. A further enhancement of tensile properties is obtained by heating the hydroxylated Polymer A stock on a hot mill as shown in the above table.

ADHESION

Adhesive cement preparation

A 5.5-g. portion of ISAF–10F carbon black containing 10% naphthenic petroleum oil is added to 150 ml. of 1,1,1-trichloroethane in a Waring Blendor; the blender is run at high speed until the black has been dispersed (as shown by brushing a strip of the dispersion on aluminum foil). Approximately 50 ml. of 1,1,1-trichloroethane are used to wash down the sides of the blender during this operation. Finally, a solution of 10 grams of hydroxylated polymer in 300 ml. of 1,1,1-trichloroethane is added while the blender is operated at high speed. When a diisocyanate is also present, it is introduced just before the cement is applied to the substrate.

PREPARATION OF TEST PIECES (1) Peel test slabs

A 7.6 x 15.2 cm. piece of a textile fabric is given five coats of a cement being tested. After the coated fabric is dried at 80° C. for one hour at 360 mm. in a nitrogen stream, it is placed in a 7.62 x 15.2 x 0.069 cm. mold with the coated side up. A 20–25 g. slab of Polymer B carcass stock formulation given in Table VI is placed against the coating on the fabric in the mold; cotton duck backing is adhered to the other side (upper) of the carcass stock. This assembly is cured in a press for 35 minutes at 160° C. (molds loaded and unloaded hot). Strips 1.27 cm. wide are then stamped out and pulled apart on an Instron Tensile Tester at a speed of 5.08 cm./min. A T-peel or 90° peel is used.

TABLE VI

| | Parts |
|---|---|
| Polymer B | 100 |
| High abrasion furnace black | 80 |
| Naphthenic petroleum oil | 47.5 |
| ZnO | 5 |
| Stearic acid | 1 |
| Sulfur | 1.5 |
| Zinc benzothiazylsulfide | 1.2 |
| Zinc dibenzyldithiocarbamate | 2.5 |

(2) H-pull specimens

The cement is brushed onto the tire cord and the coated cord is dried at 80° C. for one hour at 360 mm. Hg in a nitrogen stream. The pick-up is about 1% by weight.

The coated cord is then used to conduct single-cord adhesion tests or "H-pull tests" as described in India Rubber World, 114, pp. 213–217 (1946). The mold has channels 0.63 cm. deep and 0.63 cm. wide connected by slots 0.95 cm. long. The coated cord samples are molded as described in the above reference into Polymer B carcass stock and the assemblies, initially at 25° C., heated for 45 minutes at 160° C. under pressure. The resulting composite articles are tested as described in the reference (head speed 5.08 cm./min.).

EXAMPLE 7

Bonding Polymer B carcass stock to rayon with hydroxylated Polymer C

Some 7.62 x 15.2 cm. swatches of mono filament rayon fabric having a flat 2 x 1 weave with a count of 84 (warp) x 38 (fill) are scoured to remove conventional textile finishes by immersing in an aqueous solution of 0.1% sodium salt of modified alcohol sulfate and 0.1% Na$_3$PO$_4$ at 80° C. for 30 minutes. Finally they are water rinsed and air dried.

Half of each swatch is coated five times on one side with a cement made from a polymer (see Table VII) 1,1,1-trichloroethane, and ISAF carbon black (with petroleum oil) prepared by the general procedure given above. Each coat is air dried for about one minute before applying the next. The coated fabrics are hung for one hour in an 80° C. oven at one-half atmospheric pressure and swept by a stream of nitrogen.

A 7.62 x 15.2 cm. mold is preheated to 160° C. and loaded, in turn, with one of the above coated rayon swatches (coated side up), 20–25 g. of Polymer B Carcass Stock and covered with an untreated canvas duck fabric. The assembly is then pressed at about 131.8 kg./cm.² (13,600 kg. on a 10.2-cm. ram in a Pasadena Press) for 35 minutes at 160° C. Exclusive of the rayon, the cured assembly is about 0.20 cm. thick.

The fabric adhesion data for the resulting adhered assembly are given in Table VII.

TABLE VII

T-peel values (kg./cm.)

Polymer B carcass stock adhered to rayon fabric

| Polymer in cement: | T-peel at 25° C. |
|---|---|
| Hydroxylated Polymer C | 5–6.1 |
| Polymer C (control)[1] | 1.4–2.5 |
| Hydroxylated Polymer A | 4.6–5 |

[1] Outside the invention.

When the cement also contains 0.0075 g./ml. methylene-bis(4-phenylisocyanate), the peel values for the stocks containing hydroxylated Polymers C and A are 4.5–5.4 and 4.6–5 respectively. When part of the ISAF black in the cement containing hydroxylated Polymer A is replaced by "hard" kaolin clay, the peel value is about 4.6; if clay wholly replaces the black, the peel value is about 3.9.

EXAMPLE 8

Bonding Polymer B carcass (black) stocks to nylon fabric, polyester fabric and glass fabric with hydroxylated Polymer C The nylon fabric used is 7.6 x 15 cm. piece of monofilament fabric having a plain weave and a count of 60 (warp) x 40 (fill). Before being used, the nylon fabric and a similarly constructed polyethylene terephthalate fabric are immersed in an aqueous solution of 0.17% sodium salt of modified alcohol sulfate and 0.1% $Na_3PO_4$ at 80° C. for 30 minutes, water washed and air dried. The glass used is continuous filament spun tape; .018 cm. thick, yarn size 150½; thread count 42 x 22.

Cements are made from hydroxylated Polymer C as described in Example 7 and some cements also contained methylene bis(4-phenyl isocyanate). The fabrics are coated 5 times with the isocyanate-containing cement and pressed against Polymer B carcass (black) stocks in a 7.6 x 15 cm. mold at 160° C. for 35 minutes, as described in Example 7. The T-peel values at 25° C. for the resulting adhered composite articles are given in Table VIII. As is shown in Table VIII, excellent adhesion to nylon and polyester fabrics is attained when the isocyanate is present in the cement; this additive is not needed for adhesion of hydroxylated EPDM polymers to rayon (see Example 7).

TABLE VIII

[T-Peel values (kg./cm.) Polymer B carcass stock adhered to fabric by hydroxylated Polymer C cements]

| Fabric | Diisocyanate [1] present | diisocyanate [1] absent |
| --- | --- | --- |
| Nylon | 5-8.9 | 1.3-1.4 |
| Polyester | 3.2-3.7 | 0.5-0.6 |
| Glass | 5-5.4 | ([2]) |

[1] Methylene bis(4-phenylisocyanate).
[2] Not determined.

When Polymer B is substituted for hydroxylated Polymer C, in the diisocyanate-containing cement, the following data are obtained:

TABLE IX

| Fabric: | T-peel (kg./cm.) |
| --- | --- |
| Nylon | 0.5 |
| Polyester | 0.4 |
| Glass | 1.2 |

EXAMPLE 9

Bonding Polymer B carcass (black) stocks to nylon fabric and polyester fabric with hydroxylated Polymer A The nylon and polyester fabrics described above are coated with cements based on hydroxylated Polymer A (containing methylene bis(4-phenylisocyanate)) and bonded to Polymer B carcass stock by the same procedure as described for the corresponding hydroxylated Polymer C in Example 8. Cements are also made wherein the ISAF-10F carbon black is replaced by a 5.0 g. of clay or a mixture of 2.75 g. ISAF-10F black/2.5 g. clay. T-peel adhesion data (measured at 25° C.) are given in Table X.

TABLE X

[T-peel values (kg./cm.) Polymer B carcass stock adhered to fabric by hydroxylated Polymer A cements [1]]

| Fabric | ISAF present in cement | ISAF/clay present in cement | Clay present in cement |
| --- | --- | --- | --- |
| Nylon | 2.8-3.1 | 3.7 | 2.9-3 |
| Polyester | 1.8-3.3 | 1.5 | 1.3-1.5 |

[1] 0.0075 g./ml. of methylene bis(4-phenylisocyanate) in the cement.

EXAMPLE 10

Bonding Polymer B carcass (black) stock to nylon tire cord with hydroxylated Polymer C cement Nylon tire cord type 714 (840 denier/one end twisted to make a ply yarn/2 plies in a cable with 4.98 turns/cm. ply twist and 5.03 turns/cm. cable twist) is coated with a cement made from hydroxylated Polymer C cement (containing 0.0075 g./ml. of methylene bis(4-phenylisocyanate)) according to the previously described procedure.

When these coated cords are embedded in Polymer B carcass stock in a cold mold and cured therein for 45 minutes at 160° C., the resulting articles display the following number-average H-pull adhesion values:

Adhesion to coated cord, kg.
H-pull at 25° C. _____ 7.9
H-pull at 100° C. _____ 4.5

For purposes of comparison, Polmer B is substituted for hydroxylated Polymer C in the cement with the following results:

Adhesion to coated cord, kg.
H-pull at 25° C. _____ 3.5
H-pull at 100° C. _____ 2.4

EXAMPLE 11

Bonding Polymer B carcass (black) stock to polyester and aluminum film with hydroxylated Polymer C Polyethylene terephthalate film and aluminum film are each given three coats of the above-described cement containing hydroxylated Polymer C, ISAF-10 carbon black, 1,1,1-trichloroethane and methylene bis(4-phenylisocyanate) (0.0075 g./ml. of cement). The coated films are pressed against the Polymer B-based carcass (black) stocks in a preheated 7.62 cm. x 15.2 cm. mold under pressure at 160° C. for 35 minutes. T-peel values for the resulting composite articles are measured at 25° C. For purposes of comparison in polyester adhesion, the diisocyanate content is lowered to 0.0015 g./ml. in one cement and increased to 0.015 g./ml. in another. For purposes of comparison in the aluminum adhesion, the diisocyanate is omitted with the following results:

TABLE XI

[T-peel (kg./cm.) for cements]

| | Diisocyanate | | | |
| --- | --- | --- | --- | --- |
| Film | 0.0 g./ml. | 0.0015 g./ml. | 0.0075 g./ml. | 0.015 g./ml. |
| Polyester | ([1]) | 2.5, 3.4 | 8.9, 8.9 | 7.9, 12.5 |
| Aluminum | 1.3, 1.3 | ([1]) | 7.5, 6.8 | ([1]) |

[1] Not determined.

When Polymer B is substituted for hydroxylated Polymer C in the cement containing 0.0075 g./ml. methylene bis(4-phenylisocyanate), the T-peel values for adhesion to polyester film at 25° C. are only 0.2 and 0.4 kg./cm.

When Polymer C is substituted for hydroxylated Polymery C in the cement containing 0.0075 g./ml. methylene bis(4-phenylisocyanate) the T-peel value for adhesion to aluminum are very low—about 0.07 kg./cm.

EXAMPLE 12

Polymer E

Polymer E is prepared by saturating a 500-ml. charge of heptane of 0° C. by gas inflow with ethylene, 1 liter/min.; propylene, 2 liters/min.; hydrogen, 0.2 liter/min.; nitrogen, 0.5 liter/min. Then 4 ml. of 1,4-hexadiene is introduced. Copolymerization is begun by adding 10 millimoles of diisobutylaluminum chloride and 0.5 millimole of vanadium tris(acetylacetonate). As gas inflow has continued for 15 minutes at the above-mentioned rates, the catalyst is deactivated with isopropanol (containing antioxidant). The reaction mixture is washed with aqueous acid and then with water and evaporated to yield 18 grams of EPS Polymer E. The product has an inherent viscosity of 0.8 and contains 51.7% ethylene, 45% propylene and 3.3% 1,4-hexadiene by weight. The sulfur curable unsaturation is about 0.3 mol C=C/kg.

Preparation of hydroxylated Polymer E

A solution of 100 grams of Polymer E in one liter of heptane is treated with 15 ml. of diisoamyl borane. The temperature rises to 50° C. When infrared spectra of aliquote removed from the reactor no longer exhibit a C=C band at 10.37 microns, the reaction mixture is treated, while well stirred and cooled, with 100 ml. of 3 N NaOH, followed by 100 ml. of 30% aqueous hydrogen peroxide. When refluxing subsides, the mixture is heated for a total reflux time of two hours. The mixture is cooled and the resulting emulsion is broken by acidification with sulfuric acid. The organic layer is concentrated by evaporation of the solvent and the residual hydroxylated Polymer E is washed four times with methanol. The weight, after vacuum oven drying of the sample, is 90 grams. Hydroxylated Polymer E analyzes 0.74 g-mols OH/kg.

When hydroxylated Polymer E is substituted for the hydroxylated polymers utilized in Examples 2–11, substantially equivalent results are obtained showing that polymers having single hydroxyl groups attached to the side chains, such as hydroxylated Polymer E, are as effective for purposes of the present invention as the polymers, such as hydroxylated Polymer A, which can have two hydroxyl groups attached to the side chains.

EXAMPLE 13

An EPDM polymer is made by copolymerizing ethylene, propylene and 1,4-hexadiene in tetrachloroethylene at 28.1 kg./cm.$^2$ in the presence of a coordination catalyst formed in situ by combining VCl$_4$ and diisobutyl aluminum monochloride. The EPDM product contains 70% ethylene units, 18.9% propylene units and 11.1% total 1,4-hexadiene units by weight. The unsaturation (by bromine absorption corrected for substitution) is 1.0 C=C gram-mole/kg. polymer. The Wallace Plasticity is 45 (corresponding to ML-4/121° C. Mooney Viscosity of 67).

After 1590 ml. of 98% formic acid has been added to a 4.5% solution of 125 g. of the EPDM polymer in tetrachloroethylene at 30° C., 500 ml. of 30% aqueous hydrogen peroxide is added with stirring over a 1.5-hour period while the temperature is maintained at 30–35° C. Stirring is continued for one more hour. The reaction product mixture is washed with water containing a small amount of sodium hydroxide and isopropanol, washed with water several times and drum dried. The hydroxylated EPDM polymer thus prepared contains about 0.87 gram-mole hydroxyl/kg. and 0.13 gram-mole C=C/kg. by bromine analysis.

Solution A is prepared by mixing 90 grams of hydroxylated EPDM, 1800 ml. of hexane and 210 ml. of isopropanol. An emulsion is made by adding half of Solution A to a homomixer containing a soap solution prepared from 450 ml. water and 36 ml. of 10% aqueous anionic surfactant (an alkyl aryl sulfonate sold commercially as "Naccanol" 90F). After the emulsion has been agitated for an additional four minutes at room temperature, hexane and isopropanol are stripped off at 75° C. at atmospheric pressure and then under vacuum at 100° C. The resulting latex is creamed with 4 phr. sodium alginate (based on 100 parts of hydroxylated EPDM). The upper layer is a concentrated latex having 50–52 weight percent solids; the particle size is less than two microns.

A RFL composition is made by aging the folowing mixture for 6 hours at room temperature: 61 g. water; 2.8 g. resorcinal; 3.8 ml. 37% aqueous formaldehyde; and 1.0 ml. of 8% aqueous sodium hydroxide.

A tire cord dip is made by aging the following mixture for about 17 hours at room temperature: 8 g. latex of hydroxylated EPDM; 5.8 ml. water; 0.47 ml. 28 wt. percent aqueous ammonium hydroxide; and 11 ml. of the above RFL composition.

7.5 x 15 cm. square woven nylon swatches are coated with the hydroxylated EPDM tire cord dip and dried for 30 minutes at 100° C. The pick up (dry basis) is about 10–15 weight percent.

The coated nylon is adhered to a 3.8 mm. slab of carcas stock (see below) by heating in a plunger mold at 160° C. for 30 minutes. The 90° peel adhesion is typically 5.9 kg./cm.

| Carcass composition: | Parts by weight |
|---|---|
| Polymer B | 100 |
| HAF carbon black | 80 |
| Naphthenic petroleum oil | 50 |
| ZnO | 5 |
| Stearic acid | 1 |
| Tetramethyl thiuram monosulfide | 1.5 |
| 2-mercaptobenzothiazole | 0.75 |
| Sulfur | 1.5 |

We claim:

1. An hydroxylated alpha-olefin/non-conjugated diene, said diene containing only one polymerizable double bond, vulcanizable polymer containing about 0.05–5 gram moles hydroxyl groups per kilogram of polymer, the hydroxyl groups being attached to hydrocarbon sidechains, in admixture with at least one additive of the group; heavy metal oxide in an amount of about 3–10 parts per 100 parts of polymer, heavy metal halide in an amount of about 0.5–4 parts per 100 parts of polymer, and clay in an amount of about 30 to about several hundred parts per 100 parts of polymer, with the proviso that when the additive is heavy metal oxide or heavy metal halide a long-chain fatty acid is present.

2. The composition of claim 1 in which the hydroxylated polymer is an hydroxylated ethylene/propylene/nonconjugated diene polymer.

3. The composition of claim 2 in which the additive is a hard kaolin clay.

4. A cured composition of claim 3.

5. The composition of claim 2 in which the additive is zinc oxide or zinc bromide.

6. A cured composition of claim 5.

References Cited

UNITED STATES PATENTS

| 3,525,720 | 8/1970 | Wismer et al. | |
| 3,042,661 | 7/1962 | Kirschenbaum et al. | 260—94.7 |
| 3,082,192 | 3/1963 | Kirschenbaum et al. | 260—80.78 |
| 3,301,908 | 1/1967 | Dereich | 260—41.5 A |
| 3,382,215 | 5/1968 | Baum. | |
| 3,448,174 | 6/1969 | Loveless et al. | 260—878 |
| 3,462,516 | 8/1969 | Smith et al. | 260—45.5 A |

FOREIGN PATENTS 1,110,095    4/1968    Great Britain.

OTHER REFERENCES

Du Pont—Development Products Report #18, ECD-330, (December 1961), pp. 3 and 6.

ALLAN LIEBERMAN, Primary Examiner

H. H. FLETCHER, Assistant Examiner

U.S. Cl. X.R.

161—176; 260—29.3, 41.5 A, 77.5 AT, 80.75, 80.78, 94.7 A